United States Patent [19]

Takano et al.

[11] Patent Number: 5,070,473
[45] Date of Patent: Dec. 3, 1991

[54] MICROPROCESSOR

[75] Inventors: Makoto Takano, Tachikawa; Yasuhiko Hoshi, Fussa; Keiichi Kurakazu, Tachikawa; Shiro Baba, Tokorozawa, all of Japan

[73] Assignees: Hitachi, Ltd.; Hitachi Microcomputer Engineering Ltd., Tokyo, Japan

[21] Appl. No.: 77,442

[22] Filed: Jul. 24, 1987

[30] Foreign Application Priority Data

Aug. 22, 1986 [JP] Japan ................... 61-195455

[51] Int. Cl.$^5$ ........................... G06F 13/12
[52] U.S. Cl. ................... 395/725; 364/950; 364/950.4; 364/950.5; 364/947; 364/947.2; 364/921.8; 364/DIG. 7
[58] Field of Search ... 364/200 MS File, 900 MS File

[56] References Cited

U.S. PATENT DOCUMENTS

| | | | |
|---|---|---|---|
| 4,037,204 | 7/1977 | Bennett et al. | 364/200 |
| 4,414,664 | 11/1983 | Greenwood | 371/20 |
| 4,520,458 | 5/1985 | Hattori et al. | 364/900 |
| 4,737,932 | 4/1988 | Baba | 364/900 |

OTHER PUBLICATIONS

*The 8080/8085 Microprocessor Book*, 1980, pp. 2-26 and 33-34.
Hitachi Microcomputer Data Book, "8 bits/16 bits Microprocessor", pp. 462-463 (Sep. 1985) (w/translation).

*Primary Examiner*—Gareth D. Shaw
*Assistant Examiner*—Kevin A. Kriess
*Attorney, Agent, or Firm*—Fay, Sharpe, Beall, Fagan, Minnich & McKee

[57] ABSTRACT

A wait signal formed by a program wait circuit incorporated in a microprocessor is transmitted to outside circuitry, such as a slave microprocessor or a direct memory access control device. Thereby an outside device assumes the functions of bus master which is incorporated into a wait operation for access to a memory unit. With such a construction, a microcomputer system comprising a plurality of devices to be made into a bus mask can be simplified.

32 Claims, 4 Drawing Sheets

MICROPROCESSOR

BACKGROUND OF THE INVENTION

The present invention relates to a microprocessor, and more particularly, technology to be utilized in a microprocessor incorporating a program wait circuit for asynchronous data aquisition. The invention is particularly relevant to interfacing a central processor with a direct memory interface device.

In microprocessors of the 68000 series variety which incorporate a program wait circuit, data from peripheral devices, such as memory, is received in the following manner. At a state "0", specified by a clock (machine cycle) signal, an address bus is taken to a high impedance state. A read/write signal ("R/W") is made high to indicate the presence of the read cycle.

At a state "2", an address strobe signal (typically "AS") is made active, which is defined at a low level. This indicates that an effective address signal exists on the address bus. Peripheral devices, such as memory, together with the address bus, receive the address strobe signal, and individually determine whether they are selected. When a device is selected, it becomes active, and transmits an appropriate data signal onto the data bus.

A wait time of a program wait circuit is set, taking into account access time necessary for the particular selected device, such as the time necessary to access a selected memory. That is, one or more wait cycles are set for a selected device having a relatively low access speed.

At completion of the wait cycles, it is presumed that effective data exists on the data bus, and the data is read therefrom.

A microprocessor incorporating a program wait circuit as above-described is disclosed in, for example, "Hitachi Microcomputer Data Book, 8 bits/16 bits Microprocessor", pages 462-463, published in Sept. 1985 by Hitachi, Ltd.

When a bus control or bus master system is contained solely in a microprocessor, the selected device can be accessed without severe problems. However, if the system incorporates a device such as a slave microprocessor or a direct memory access device, a control circuit will be necessary to command the above-mentioned wait cycle.

SUMMARY OF THE INVENTION

An object of the invention is to provide a simplified microprocessor system, with which a memory access control system for use in a multiple controlled systems memory is to be implemented.

In accordance with the present invention, a wait signal is formed by an incorporated program wait circuit. The wait signal is transmitted to an external terminal. A device serves as a bus master which is utilized in a wait operation, and which works in conjunction with the wait signal.

In accordance with another aspect of the present invention, an output circuit enables wired logic configurations which are used as drive circuits to transmit a wait signal formed by the incorporated program wait circuit. The wait signal is then supplied from an external terminal, thereby allowing for variation in a wait function of a microprocessor.

An advantage of the present invention is the provision of a simplified device in which a plurality of devices may be more simply accessed to a bus by implementation of a bus control device.

Another advantage of the present invention is the provision of a microprocessor having variable wait function, which provides for access to slower and faster memory devices.

Another advantage of the present invention is that the program wait circuit can be utilized in a wait operation of a slave microprocessor or a direct memory access control device.

Further advantages will become apparent to one of ordinary skill in the art after a reading and understanding of the following specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof, and wherein.

DETAILED DESCRIPTION OF THE PREFERRED EMBODIMENTS

Figure 1:
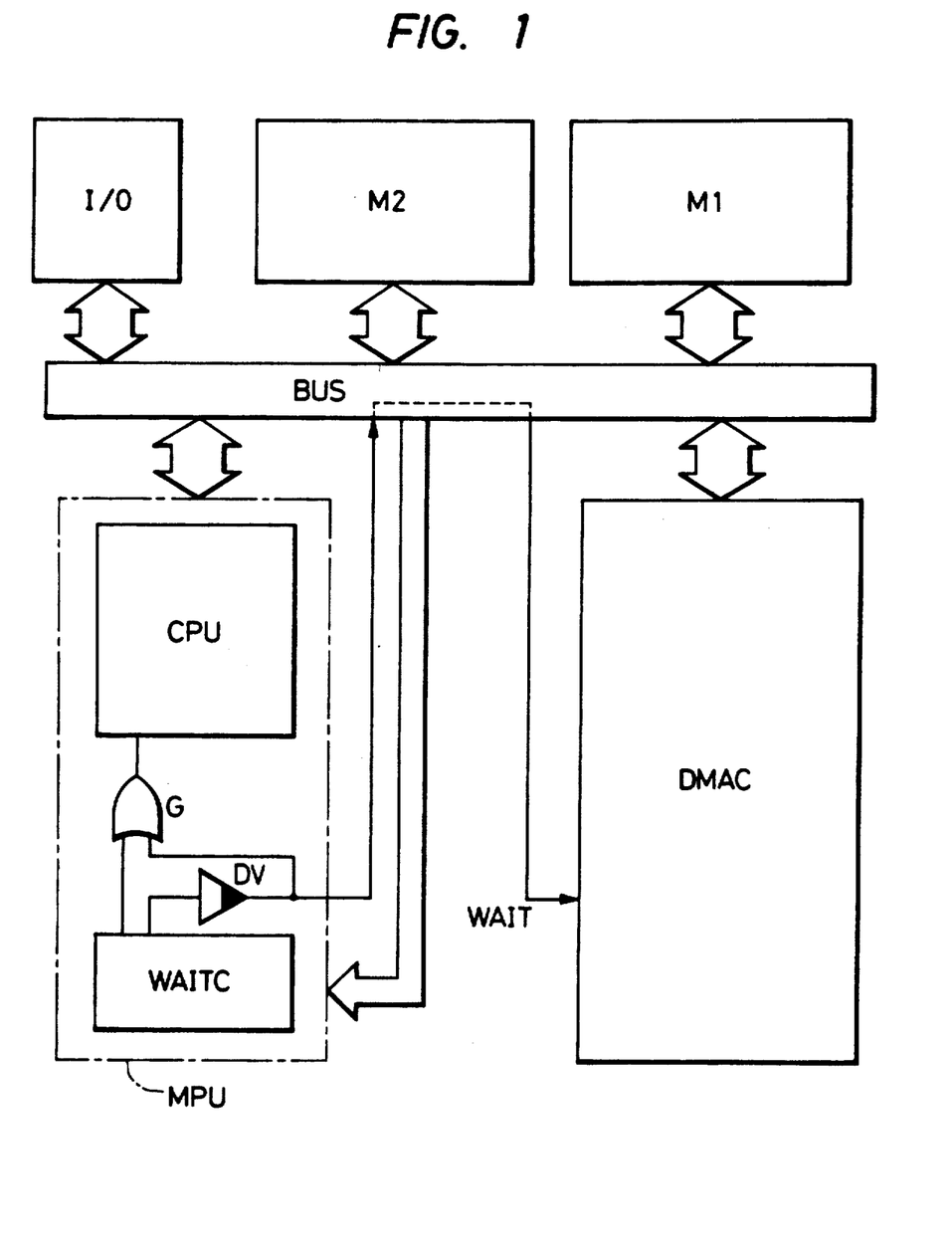
FIG. 1 is a block diagram illustrating an embodiment of a bus control system of the present invention.

FIG. 1 is a block diagram illustrating a first embodiment of the present invention. A microprocessor MPU is suitably a microprocessor of the 68000 series. Incorporated therein is a central processor unit CPU, and a program wait circuit WAITC. A direct memory access control unit DMAC functions as a bus controller or master. Memory devices M1 and M2 are, for example, RAM (random access memory) or ROM (read only memory) devices. At least one is a memory device having relatively low access speed, such as is typically found in dynamic RAM. An input/output device I/O is, for example, a mass storage device such as a floppy disc memory.

The microprocessor MPU, the direct memory access control device DMAC, the memory devices M1, M2, and the input/output device I/O, are mutally connected by a bus system, BUS, comprised of an address bus, a data bus, a control bus or the like.

A suitable microprocessor MPU, which incorporates the program wait circuit WAITC, is readily available from the assignee of the present application, and is identified as product no. "HD64180."

The program wait circuit WAITC inserts a wait signal during selected machine cycles, defined as a preselected number of clock cycles, during accesses to relatively low speed memory devices such as the input/output device I/O as above-described. In this embodiment, the program wait circuit WAITC supplies a wait signal through an OR gate circuit G to the central processing unit CPU. The program wait circuit WAITC also supplies the wait signal to a bus made by transmitting it through a drive circuit DV to an external circuit.

A wait control signal output through the drive circuit DV is supplied to the direct memory access control device DMAC in the micropcomputer system of the embodiment. The drive circuit DV is suitably comprised of an open drain output circuit so that the wait signal can be supplied from an external terminal; i.e. wired logic at the output terminal. Consequently, a wait signal supplied from the external terminal may also be supplied through the OR gate circuit G to the central processing unit CPU. In this fashion, a wait period for the CPU may be supplemented by an external device such as the DMAC.

The program wait circuit WAITC receives a signal from the BUS, and directs the direct memory access control circuit DMAC to become a bus master.

The direct memory access control circuit DMAC functions as a timing means, and undertakes a microcomputer function as it assumes the functions of a bus master from the microprocessor MPU. After it commences this function, the DMAC oversees data transfers among such devices as memory devices M1, M2, and the input/output device I/O. If the access speed of the memory device M1 or M2 or the input/output device I/O is relatively slow, insertion of the above-mentioned wait signal by the circuit WAITC is required. In this embodiment, even when the direct memory access control device DMAC obtains bus use priority in place of the microprocessor MPU, the program wait circuit WAITC is started at a prescribed time. The program wait circuit WAITC generates a wait signal WAIT corresponding to a speed (access cycle) of the memory device or the input/output device to which access of the direct memory access control device DMAC is desired, and supplies it through the drive circuit DV to the direct memory access control device.

The direct memory access control device DMAC transmits the prescribed timing signal and address signal corresponding to the machine cycle. A peripheral device, such as a memory, receives the address signal and discerns whether it is selected. On a determination that is selected, the selected device is rendered active, and transmits a read signal to the data bus. The timing for memory access is therefore dictated by a combination of the direct memory access control.

The program wait circuit transmits a wait signal corresponding to a particular access time of the selected device. Consequently, the direct memory access control device DMAC executes one or more additional wait cycles prior to the data transfer cycle, and then deems that effective data exists on the data bus and enables a read thereof. That is, insertion of the assigned wait cycle extends the machine cycle (bus cycle).

Figure 2:
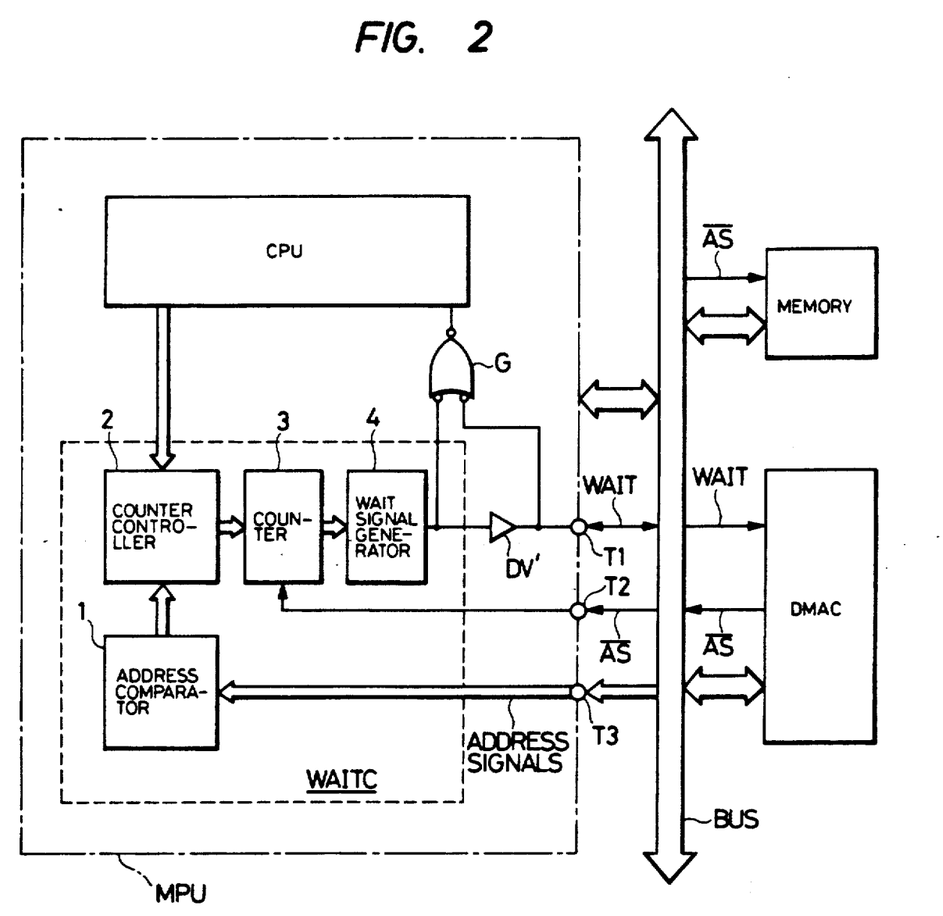
FIG. 2 is a block diagram illustrating another embodiment of the invention of FIG. 1.

FIG. 2 is a block diagram illustrating another embodiment of the present invention. A microprocessor MPU, a direct memory access control circuit DMAC, and a memory, are coupled through a system BUS. A wait circuit WAITC, incorporated in the microprocessor MPU, includes an address comparator 1 for discerning whether an address signal on BUS is included in a prescribed address region; a counter controller 2 for determining the wait cycle number; a counter 3 for determining a start timing and an end timing of the wait signal; and a wait signal generator 4 for forming a wait signal. The counter 3 is a down counter, with its initial value being supplied by the counter controller 2.

A count down of counter 3 is started so as to correspond to a fall timing of an address strobe signal AS. From the fall timing of the address strobe signal AS until the counter value becomes 0, the wait signal generator 4 forms the wait signal WAIT at a low level.

The wait signal WAIT is transmitted through an output circuit DV' and an output terminal T1 for connection outside of the microprocessor. The wait signal WAIT, transmitted from the microprocessor MPU, is supplied through BUS to the direct memory access control device DMAC. A period of one machine cycle of the direct memory access control device DMAC is added corresponding to a period when the wait signal WAIT is at a low level.

The address strobe signal AS is supplied from the direct memory access control device DMAC to a memory to be accessed. If the address strobe signal AS falls, the accessed memory recognizes that the address signal on the BUS is established and it is taken in. Subsequently, a data read or write operation is executed. The address strobe signal AS is taken through the terminal T2 into the microprocessor MPU, and used to govern the operation timing of counter 3.

Figure 3A:
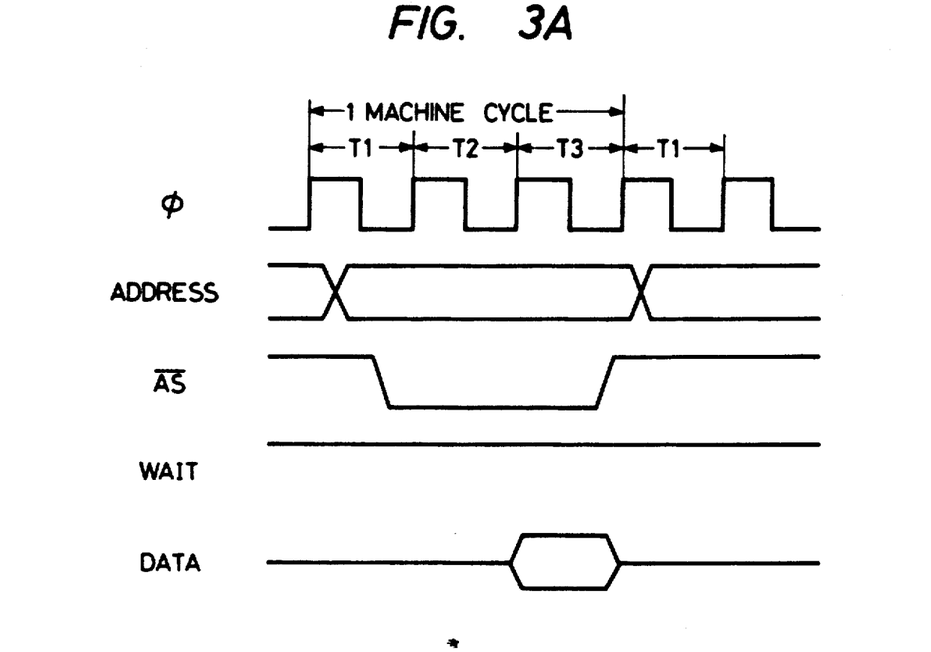
FIGS. 3A and 3B are timing charts illustrating operation of the device of FIG. 2.

FIG. 3A shows a timing chart, illustrating when the direct memory access control device DMAC reads data from a high-speed memory coupled with the BUS. In the embodiment, a period of one machine cycle is defined as three cycles of the reference inner clock. In the first cycle T1, the direct memory access control circuit DMAC transmits an address signal onto the bus. After the address signal is transmitted, the address strobe signal AS falls, thereby the high-speed memory takes the address signal inside and a data read operation is started. Subsequently, in the third cycle T3, the read data is transmitted onto the BUS. The wait signal WAIT is made high during the period from the first cycle T1 to the third cycle T3. The address comparator 1, within the wait circuit WAITC, supervises the address signal through the terminal T3 so that the access state of the high-speed memory can be recognized. The counter controller 2 correspondingly sets the inital value 0 to the counter 3.

Figure 3B:
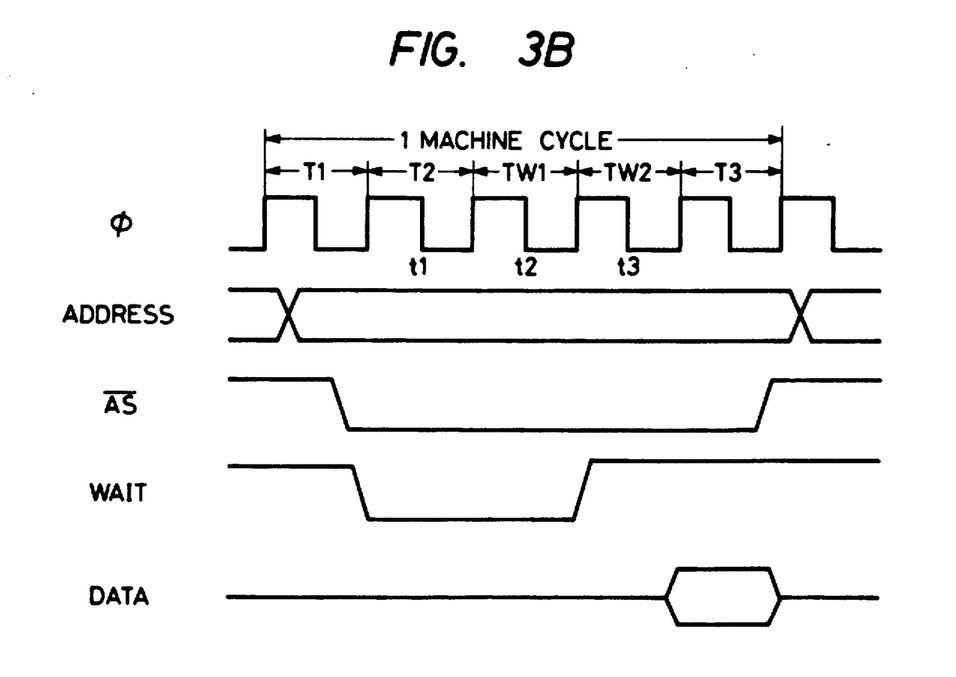

FIG. 3B illustrates the timing when the direct memory access control device DMAC reads data from a low-speed memory coupled with BUS. In the embodiment, a period of one machine cycle is defined at five cycles of the reference inner clock. That is, wait cycles TW1 and TW2 are added between the second cycle T2 and the third cycle T3, which corresponds to the operation speed of the low-speed memory. In the first cycle T1, the direct memory access control circuit DMAC transmits the address signal onto the bus. The address signal is transmitted and then the address strobe signal AS falls. The low-speed memory thereby takes in the address signal and a data read operation is commenced. The address comparator 1 within the wait circuit WAITC supervises the address signal so that an access state of the low-speed memory can be recognized.

The counter controller 2 correspondingly sets the initial value 2 to the counter 3. The initial value can be arbitrarily set to correspond to the operation speed of the accessed memory. As a result, the wait signal WAIT is made low during a period of approximately two cycles from the fall timing of the address strobe signal AS. Level detection timing of the wait signal WAIT is made of the fall time of clock after the second cycle T2. That is, since the wait signal WAIT is low at the fall time T1 of clock in the second cycle T2, the first wait cycle TW1 is added. Next, since the wait signal WAIT is low at the fall time T2 of clock in the wait cycle TW1, the second wait cycle TW2 is added. Next, since the wait signal WAIT is made high at the fall time T3 of clock in the second wait cycle TW2, the wait cycle is not added. During the wait cycle, the address signal and the address strobe signal AS maintain the previous state. Data is transmitted onto the BUS until the third cycle T3. Consequently, the direct memory access control device DMAC can take data on the bus in the third cycle T3 as effective data.

Figure 4:
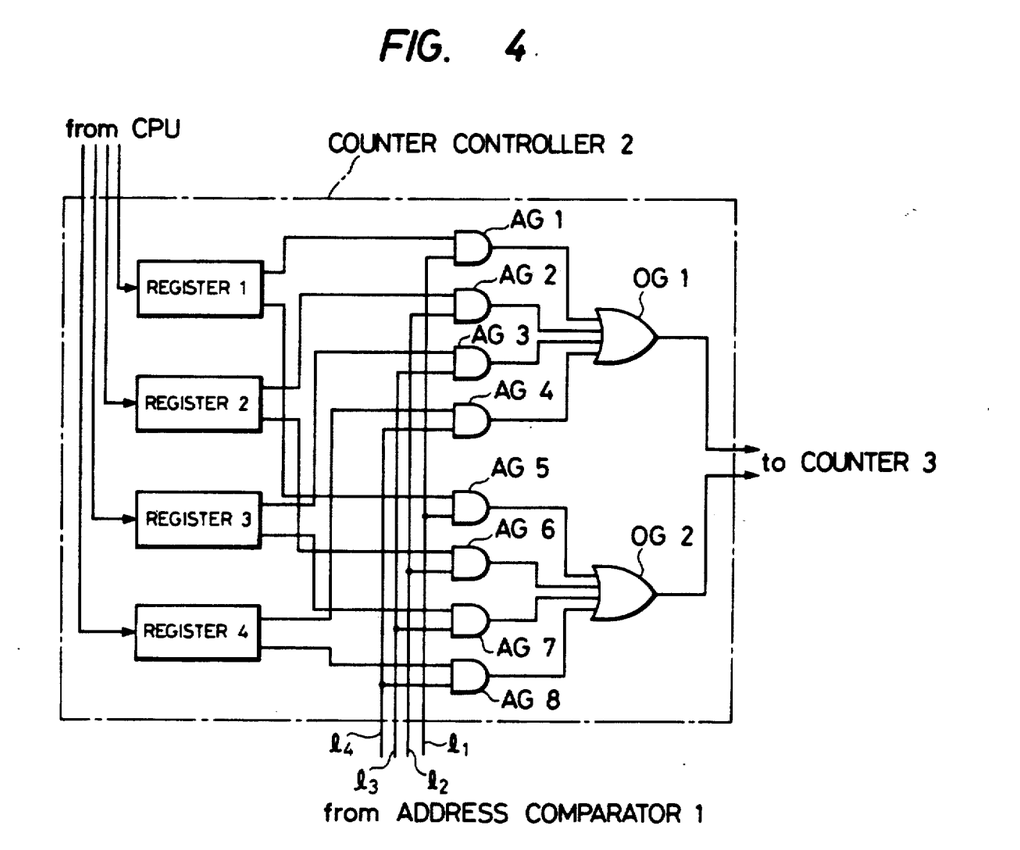
FIG. 4 is a diagram illustrating an embodiment of the counter controller 2 shown in FIG. 2.

FIG. 4 is a block diagram of an embodiment of the counter controller 2 of FIG. 2. In the embodiment, four registers 1-4 are implemented to store the wait cycle number. The wait cycle number is written by the CPU. For example, in the register 1, "00" is written to indicate that the wait cycle number is 0; in the register 2, "01" is written to indicate that the wait cycle number is 1; in the register 3, "10" is written to indicate that the wait cycle number is 2; and in the register 4, "11" is written to indicate that the wait cycle number is 3. In order to select any of the registers, AND gates AG1-AG8 and OR gates OG1, OG2 are installed. For example, among output signal lines 1-4 of the address comparator 1, signal line 3 is made high. The AND gates AG3 and AG7, to which the signal line 3 is connected at respective input terminals, are thereby selected. As a result, the content "10" of the register 3 is supplied through the OR gates OG1, OG2 to the counter 3.

In FIG. 2, the CPU can execute the wait cycle not only by the wait signal formed at the wait circuit WAITC, but also by the wait signal formed outside of the MPU. That is, the terminal T1 serves an an input/output common terminal, and the output drive DV' enters a high-impedance state during the wait signal input. The wait signal is supplied through the gate G to the CPU. If at least one of the two input signals of the gate G is made low, a low output signal is formed.

In the microcomputer, which includes the microprocessor MPU, which in turn incorporates the program wait circuit WAITC as above-dscribed, when a direct memory access control device DMAC or a slave microprocessor serving as a bus master exists, the program wait circuit WAITC, incorporated in the master microprocessor, is utilized thereby simplifying the system. The circuit WAITC is disenabled when another device adopts the function of the bus master. Consequently, even if the program wait circuit WAITC is used in another device acting as a bus master, no problems will be produced.

Further, the signal formed by the program wait circuit WAITC is transmitted to the external terminal by the drive circuit DV so as to enable the wired logic. Thereby, if necessary, the microprocessor MPU can perform a wait operation from an externally installed wait control circuit.

Effects obtained from the above-mentioned embodiments are as follows:

(1) A wait signal formed by the incorporated program wait circuit is transmitted to an external terminal. A device to serve as a bus master, such as a slave microprocessor or a direct memory access control device, can be utilized in the wait operation. The microcomputer system comprised of a plurality of devices to be made into a bus master can be simplified.

(2) Output circuits to enable wired logic, such as in open drain configurations are used as drive circuits to transmit a wait signal formed by the incorporated program wait circuit to an external terminal. The wait signal can thereby be supplied from the external terminal. The wait function in the microprocessor may therefor be varied.

Various modifications of the subject device are easily implemented. The bus is adaptable to function such that a data signal and an address signal are transmitted during a time sequence. That is, the slave processor or the direct memory access control device may transmit address and data in a time division system to the address bus of the microprocessor. Further, the terminal to which output signal of the program wait circuit and the terminal which is installed, if necessary, and to which wait signal is supplied from outside, may be independent of each other.

The invention can be widely utilized in a microprocessor incorporating a program wait circuit.

Effects obtained by the invention are briefly described as follows. A wait signal formed by the incorporated program wait circuit is transmitted to the external circuit. Thereby a device to serve as another bus mask, such as a slave microprocessor or a direct memory access control device, can be utilized in the wait operation and the system can thus be simplified.

The invention has been described with reference to preferred embodiments. Obviously, modifications and alterations will occur to others upon reading and understanding of this specification. It is intended that all such modifications and alterations be included insofar as they come within the scope of the claims or the equivalents thereof.

What is claimed is:

1. A microprocessor comprising:

a central processor unit;

wait signal generating means for selectively generating a wait signal having a duration representative of a distinct access time among at least first and second memory devices associated with the microprocessor;

a first operation interrupting means for interrupting operation of the central processor unit in accordance with the wait signal, the first operation, interrupting means being operatively connected with the central processing unit and the wait signal generating means;

a wait signal supplying means for supplying the wait signal from the wait signal generating means to an associated memory interface control device;

a second operation interrupting means for interrupting operation of the central processor unit in response to a signal from the associated memory interface control device, the second operation interrupting means being operatively connected with the central processor unit and an external terminal of the microprocessor;

monitoring means for monitoring memory address information on an associated bus;

an address data acquiring means for acquiring preselected address data representative of addresses for a one of the memory devices which has a data access rate slower than another of the memory devices;

comparison means in data communication with the monitoring means for comparing monitored memory address information to the acquired address data;

comparison signal generating means in data communication with the comparison means for generating a comparison signal in accordance with the comparing of the monitored memory address information with the acquired address data; and the wait signal generating means being in data communication with the comparison signal generating means for selectively supplying the wait signal in accordance with the comparing of the monitored memory address information with the acquired address data.

2. The microprocessor of claim 1 wherein the wait signal generating means includes duration varying means for outputting duration data for varying duration of the wait signal in accordance with access times of a plurality of different memory devices.

3. The microprocessor of claim 2 wherein the duration varying means includes a digital timer, an initial value of which is preset in accordance with the comparison signal.

4. The microprocessor of claim 3 wherein the duration varying means further includes a plurality of storage means for storing data representative of a plurality of initial values and means for selectively loading one of the initial values into the digital timer.

5. In a microcomputer system, a method of accessing, via at least one of a microprocessor and a memory interface control device, at least first and second memory devices each having distinct access times the method comprising:
   electronically generating a wait signal representative of a distinct access time among the first and second memory devices;
   interrupting operation of a central processor of the microprocessor system in response to the wait signal;
   selectively supplying the wait signal to the memory interface control device;
   electronically generating a read signal to enable placement of data on an associated bus;
   waiting for a preselected settling period after placement of data on the associated bus;
   electronically generating a write signal to enable removal of data from the associated bus after the settling period;
   delaying generation of the write signal in response to the wait signal; and
   interrupting operation of the central processor in response to one of the read and write signals.

6. The method of claim 5 further comprising the steps of:
   monitoring memory address information on the associated bus;
   electronically comparing monitored address information to preselected address data; and
   selectively providing the wait signal in accordance with the comparison of the monitored address information and the preselected address data.

7. The method of claim 6 further comprising the step of varying a duration of the wait signal in accordance with access time of each of a plurality of different memory devices.

8. The method of claim 7 further comprising the steps of loading a numeric value, the value of which is proportional to the duration of the wait signal, into a digital timer; and
   generating the wait signal in accordance with the numeric value.

9. The method of claim 8 further comprising the step of retrieving the numeric value from an associated data storage device.

10. A microcomputer system comprising:
    a bus;
    a memory means coupled to said bus for storing information therein;
    a microprocessor coupled to said bus including:
       a central processing unit for accessing said memory means in accordance with predetermined states,
       wait control means for providing a wait signal that indicates whether or not at least one wait state is to be inserted into said predetermined states when said central processor unit accesses said memory means via said bus, and
       an external terminal to which said wait signal is supplied;
    a control device coupled to said bus and coupled to receive said wait signal supplied from said external terminal of said microprocessor for accessing said memory means via said bus in accordance with the predetermined states with the inserted wait state when said control device obtains bus use priority in place of said microprocessor; and,
    said wait control means in said microprocessor including means responsive to an address signal supplied from one of said microprocessor and said control device for determining a number of the wait states to be inserted.

11. A microprocessor system according to claim 10, wherein said control device is a slave microprocessor.

12. A microprocessor system according to claim 10, wherein said control device is a direct memory access controller.

13. A microprocessor for use with
    a bus coupled to the microprocessor;
    an external device coupled to the bus including memory means for providing data to the bus in response to access thereof; and
    an external control device coupled to the bus for accessing the external device by providing an address signal assigned to the external device to the bus when the external control device has obtained bus use priority in place of the microprocessor;
    the microprocessor comprising:
       a CPU means for accessing the external device by providing the address signal assigned to the external device to the bus when the microprocessor has obtained the bus use priority in place of the external control device;
       address discerning means coupled to receive the address signal on the bus for discerning whether or not the external device is accessed, and providing a control signal when the external device is accessed;
       wait control means responsive to the control signal and including a control register for storing information indicating that whether or not at least one wait state is to be inserted when the external device is accessed, and a wait signal providing circuit responsive to the information in the control register for providing a wait signal when the information indicates that at least one wait state is to be inserted in accessing of the external device; and
       an external terminal coupled to receive the wait signal to communicate the wait signal to the external control device, whereby the CPU means having the bus use priority accesses the external device in accordance with predetermined states when the CPU means receives no wait signal from the wait control means and accesses the external device in accordance with the predetermined states and the at least one wait state when the CPU means receives the wait signal from the wait control means, and whereby the external control device having the bus use priority accesses the external device in accordance with the predetermined states when the external control device receives no wait signal from the wait control means in the microprocessor via the external terminal and accesses the external device in accordance with the predetermined states and the at least one wait state when the external control device receives the wait signal from the wait control means in the microprocessor via the external terminal.

14. The microprocessor of claim 13, wherein the predetermined states include an effective address setting state and a data reading state, and wherein the at least one wait state is entered between the setting state and the reading state.

15. A microprocessor according to claim 14, further comprising an output circuit having its output coupled to receive the wait signal and its input coupled to the external terminal; and
an OR gate circuit having an output coupled to the CPU means and two inputs, one of which is coupled to the external terminal and the other of which is coupled to receive the wait signal.

16. A microprocessor according to claim 13, wherein the information in the control register includes data for determining a number of the wait states to be inserted into the predetermined states,
wherein the wait signal providing means further including:
counter means responsive to the data for timing insertion of the wait states in response to an address strobe signal (AS) changing from a first level to a second level, the address strobe signal being supplied from the bus and being at the second level for the effective address setting state, the data reading state and the wait state, and
providing means responsive to an output of the counter means for providing the wait signal.

17. A microprocessor according to claim 13, wherein the external device includes a dynamic random access memory or a floppy disk memory device, and wherein a second external device includes a read only memory.

18. A microprocessor according to claim 17, wherein the external control device includes a slave-microprocessor or a direct memory access controller.

19. A microprocessor for use with;
a bus coupled to the microprocessor;
a first external device coupled to the bus and for providing data to the bus in a first access time in response to reception of an address signal assigned thereto from the bus;
a second external device coupled to the bus and for providing data to the bus in a second access time in response to reception of an address signal assigned thereto from the bus, the second access time being shorter than the first access time; and
an external control device coupled to the bus and for accessing one of either the first and second external devices by providing a corresponding address signal to the bus when the external control device has obtained bus use priority in place of the microprocessor,
the microprocessor comprising:
a central processing unit for accessing one of either the first and second external devices by providing a corresponding address signal to the bus when the microprocessor has obtained the bus use priority in place of the external control device;
address discriminating means coupled to the bus and responsive to the address signal on the bus for providing a first control signal when discriminating that the address signal on the bus is assigned to the first external device, and providing a second control signal when discriminating that the address signal on the bus is assigned to the second external device;
wait signal formation means coupled to the address discriminating means for providing a wait signal when receiving the first control signal, and providing no wait signal when receiving the second control signal, wherein the wait signal formation means supplies the wait signal to the central processing unit; and
an external terminal coupled to the wait signal formation means for outputting the wait signal to communicate the wait signal to the external control device,
whereby the central processing unit access the first external device in a predetermined machine cycle and accesses the second external device in an extended machine cycle longer than the predetermined machine cycle in response to the wait signal supplied from the wait signal formation means, and
whereby the external control device accesses the first external device in the predetermined machine cycle and accesses the second external device in the extended machine cycle longer than the predetermined machine cycle in response to the wait signal supplied from the wait signal formation means via the external terminal.

20. A microprocessor according to claim 19, wherein the first external device includes a dynamic random access memory or a floppy disk memory device, and wherein the second external device includes a read only memory.

21. A microprocessor according to claim 20, wherein the external control device includes a slave-microprocessor or a direct memory access controller.

22. A microprocessor according to claim 19, wherein the microprocessor further comprising:
an output circuit having its output coupled to receive the wait signal and its input coupled to the external terminal; and
an OR gate circuit having an output coupled to the CPU means and two inputs, one of which is coupled to the external terminal and the other of which is coupled to receive the wait signal.

23. A microprocessor according to claim 20, wherein the wait signal formation means includes:
a first control register for storing information indicating that the first external device is accessed in accordance with the predetermined machine cycle;
a second control register for storing information indicating that the second external device is accessed in accordance with the extended machine cycle;
selector means for providing the information in the first control register in response to reception of the first control signal and providing the information in the second control register in response to the second control signal; and
means responsive to reception of the information in the second register for providing the wait signal so as to extend the predetermined machine cycle to the extended machine cycle.

24. A microprocessor according to claim 23, wherein the predetermined machine cycle includes an effective address state and a data reading state, and wherein the extended machine cycle includes an effective address state, a data reading state, and a wait state between the effective address state and data reading state.

25. A microprocessor according to claim 24, wherein the information in the second register includes data for determining a number of the wait states to be inserted between the effective address state and data reading state, and wherein the providing means in the wait signal providing means includes:
    counter means responsive to the data in the second register for timing insertion of the wait states in response to an address strobe signal changing from a first level to a second level, the address strobe signal being supplied from the bus and being at the second level for the effective address setting state, the data reading state and the wait state, and
    outputting means responsive to an output of the counter means for outputting the wait signal.

26. A microprocessor system comprising:
    a bus;
    a first external device coupled to the bus and for providing data to the bus in a first access time in response to reception of address signal assigned thereto from the bus;
    a second external device coupled to the bus and for providing data to the bus in a second access time in response to reception of address signal assigned thereto from the bus, the second access time being shorter than the first access time; and
    a microprocessor coupled to the bus and including:
        a central processing unit for accessing one of either the first and second external devices by providing a corresponding address signal to the bus when the microprocessor has obtained the bus use priority in place of the external control device;
        address discriminating means coupled to the bus and responsive to the address signal on the bus for providing a first control signal when discriminating that the address signal on the bus is assigned to the first external device, and providing a second control signal when discriminating that the address signal on the bus is assigned to the second external device;
        wait signal formation means coupled to the address discriminating means for providing a wait signal when receiving the first control signal, and providing no wait signal when receiving the second control signal, wherein the wait signal formation means supplies the wait signal to the central processing unit; and
        an external terminal coupled to the wait signal formation means for outputting the wait signal to communicate the wait signal to the external control device;
    wherein the central processing unit accesses the first external device in a first predetermined machine cycle and accesses the second external device in a first extended machine cycle longer than the first predetermined machine cycle in response to the wait signal supplied from the wait signal formation means,
    an external control device coupled to the bus and for accessing one of either the first and second external devices by providing a corresponding address signal to the bus when the external control device has obtained bus use priority in place of the microprocessor, wherein the external control device accesses the first external device in the second predetermined machine cycle and accesses the second external device in a second extended machine cycle longer than the second predetermined machine cycle in response to the wait signal supplied from the wait signal formation means in the microprocessor via the external terminal.

27. A microprocessor system according to claim 26, wherein the first external device includes a dynamic random access memory or a floppy disk memory device, and wherein the second external device includes a read only memory.

28. A microprocessor system according to claim 27, wherein the external control device includes a slave-microprocessor or a direct memory access controller.

29. A microprocessor system according to claim 26, wherein the microprocessor further comprising:
    an output circuit having its output coupled to receive the wait signal and its input coupled to the external terminal; and
    an OR gate circuit having an output coupled to the CPU means and two inputs, one of which is coupled to the external terminal and the other of which is coupled to receive the wait signal.

30. A microprocessor system according to claim 29, wherein the wait signal formation means includes:
    a first control register for storing information indicating that the first external device is accessed in accordance with the predetermined machine cycle,
    a second control register for storing information indicating that the second external device is accessed in accordance with the extended machine cycle,
    selector means for providing the information in the first control register in response to reception of the first control signal and providing the information in the second control register in response to the second control signal, and
    means responsive to reception of the information in the second register for providing the wait signal so as to extend one of the first predetermined machine cycle to the first extended machine cycle and the second predetermined machine cycle to the second extended machine cycle.

31. A microprocessor system according to claim 30, wherein at least one of the first and second predetermined machine cycle includes an effective address state and a data reading state, and wherein the at least one of the first and second extended machine cycles includes an effective address state, a data reading state, and a wait state between the effective address state and data reading state.

32. A microprocessor system according to claim 31, wherein the information in the second register includes data for determining a number of the wait states to be inserted between the effective address state and data reading state, and wherein the providing means in the wait signal providing means includes:
    counter means responsive to the data in the second register for timing insertion of the wait states in response to an address strobe signal changing from a first level to a second level, the address strobe signal being supplied from the bus and being at a second level for the effective address setting state, the data reading state and the wait state; and
    outputting means responsive to an output of the counter means for outputting the wait signal.

* * * * *